United States Patent
Gugwad et al.

(10) Patent No.: US 11,277,285 B1
(45) Date of Patent: Mar. 15, 2022

(54) CONTINUOUS TIME LINEAR EQUALIZATION SYSTEM AND METHOD

(71) Applicant: Cadence Design Systems, Inc., San Jose, CA (US)

(72) Inventors: Sachin Gugwad, Karnataka (IN); Jaya Madhaba Panda, Odisha (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/160,655

(22) Filed: Jan. 28, 2021

(51) Int. Cl.
*H04L 25/03* (2006.01)

(52) U.S. Cl.
CPC .............................. *H04L 25/03057* (2013.01)

(58) Field of Classification Search
CPC .. H04L 25/03057; H04B 1/16; H03G 3/3036; H03G 2201/106; H03H 11/28
See application file for complete search history.

(56) References Cited

U.S. PATENT DOCUMENTS

| | | | |
|---|---|---|---|
| 9,438,450 B1* | 9/2016 | Kang | H04L 25/03885 |
| 10,862,521 B1* | 12/2020 | Raviprakash | H04B 1/16 |
| 2008/0247452 A1* | 10/2008 | Lee | H04L 25/03019 |
| | | | 375/232 |

* cited by examiner

*Primary Examiner* — Janice N Tieu
(74) *Attorney, Agent, or Firm* — Mark H. Whittenberger, Esq.; Holland and Knight LLP

(57) ABSTRACT

The present disclosure relates to an apparatus and method for continuous time linear equalization. Embodiments include determining, using a decision feedback equalization ("DFE") training block, a voltage value for one or more resistor values. Embodiments may further include determining, using the DFE training block, a voltage value for one or more capacitor values and identifying a voltage difference between the voltage value for one or more resistor values and the voltage value for one or more capacitor values. Embodiments may further include iteratively performing the determining of the voltage value and identifying of the voltage difference for each of the plurality of capacitor values until the voltage difference is at one or more minimum values to generate one or more optimal resistor and capacitor coefficients for a continuous time linear equalization filter.

20 Claims, 20 Drawing Sheets

| # | Terms | Description |
|---|---|---|
| 1 | RX_L | Receiver with lower VREFL (Lower voltage reference will be chosen when previous bit is low) |
| 2 | RX_H | Receiver with lower VREFH (Higher voltage reference will be chosen when previous bit is high) |
| 3 | RX_Cal | Calibration Receiver used for error sampling. This is used to get E samples during CTLE training |
| 4 | VREFL_SEL | Reference voltage generator's control codes which sets VREFL voltage level (Lower voltage reference) |
| 5 | VREFH_SEL | Reference voltage generator's control codes which sets VREFH voltage level (Higher voltage reference) |
| 6 | VREFE_SEL | Reference voltage generator's control codes which sets VREFE voltage level (Voltage reference of error x) |
| 7 | VREFL/VREFH | DFE trained voltage reference for receiver |
| 8 | VREFE | Reference voltage for error receiver |
| 9 | RX_CTLE_RES[3:0] | Receiver CTLE filter resistor coefficients |
| 10 | RX_CTLE_CAP[2:0] | Receiver CTLE filter capacitor coefficients |
| 11 | RX_CTLE_RES_TRAIN[3:0] | Receiver CTLE filter resistor coefficients used only during training and connected to calibration receiver only |
| 12 | RX_CTLE_CAP_TRAIN[2:0] | Receiver CTLE filter capacitor coefficients used only during training and connected to calibration receiver only |
| 13 | RX_EQ_TRAIN_MODE[1:0] | 00 → CTLE training mode is selected |
| 14 | RX_EQ_TRAIN_EN[2:0] | 000 → Training mode is disabled ( Normal read mode is enabled)<br>1000 → Training mode is enabled |
| 15 | I_DOUT | Received data sampled by ICLK |
| 16 | I_DOUT_DLY | Previous bit of I_DOUT |
| 17 | Q_DOUT | Received data sampled by QCLK (It used as error data during DFE training sampled by ICLK) |
| 18 | Q_DOUT_DLY | Previous bit of Q_DOUT |
| 19 | QCLK | Clock used to sample edge of data eye |
| 20 | ICLK | Clock used to sample center of data eye |
| 21 | I samples | Reference receiver output used in DFE training. These samples are used as reference data |
| 22 | E samples | Error receiver output used in DFE training. These are actual error samples used in LMS based DFE training. |

FIG. 4

| Mode | RX_DFE_TRAIN_EN position1 | RX_CDL_TRAIN_EN position2 | RX_X_Al_MODE | LRXTRN Valid Received Data | CL_POSITION Valid Received Q Data |
|---|---|---|---|---|---|
| Normal Mode | XX | 000 | X | k samples, i samples, sampled at CLK | k samples - RX_CLK output sampled at CLK |
| TLE Training Mode from calibration mode | XX | =000 | 0 | k samples, i samples, based on DFE previous i samples, sampled at CLK | |
| TLE Training Mode Calibration mode | XX | 001 | 1 | k samples, i logic "1" | k samples - "301E" |

600

During these states all receivers are data-recovering for calibrate and input referenced offset (see figure 3). As such during this time received samples are not valid. Thus to avoid entry, i samples and k samples are defined such a way that CTLE tracking algorithm ignores these samples during calibration mode

FIG. 6

Registers used

| Sl.No | Register Name | Description |
|---|---|---|
| 1 | "VREF_INIT" | Trained VREF value (from CDR/VREF training) |
| 2 | "R_CODE" | Final resistor setting for CTLE, updated every step |
| 3 | "C_CODE" | Final capacitor setting for CTLE, updated every step |
| 4 | "VCTLE_LF<x>" | Low frequency voltage for CTLE updated every R_CODE. Register index<x> varies from "R_MIN" to "R_MAX" |
| 5 | "VCTLE_HF" | High frequency voltage for CTLE updated every R_CODE and C_CODE |
| 6 | "VCTLE_DV" | Delta VREF between "VCTLE_LF" and "VCTLE_HF" |
| 7 | "R_MIN" | Initial value of Resistor |
| 8 | "R_MAX" | Maximum value of Resistor |
| 9 | "C_MIN" | Initial value of Capacitor |
| 10 | "C_MAX" | Maximum value of Capacitor |

| | |
|---|---|
| CTLE Training (Single loop) | |
| Set RX_EQ_TRAIN_MODE<1:0> = 00 | Pattern 1 is all 0 very low frequency patterns like 10000000010000000... (Programmable Pattern)<br>Pattern 2 is PRBS (same as DFE pattern) |
| | Load register "VREFL_FINAL" and VREFH_FINAL" in to VREFL and VREFH<br>Load default R_CODE and C_CODE in RX_CTLE_RES<2:0> and RX_CTLE_CAP<2:0><br>Load RX_CTLE_RES_TRAIN<2:0> and RX_CTLE_CAP_TRAIN<2:0> with "R_MIN" and "C_MIN"<br>Load VREFE = "VREF_INIT"<br>Register index <x> = 0<br>Load "VCTLE_DV" = 255 (Max value) |
| RX_EQ_TRAIN_EN<2:0>= 001 | |
| STEP A: VCTLE_LF calculations (refer Fig 5a) | Use pattern1 for VCTLE_LF calculation |
| | Set RX_CTLE_CAP_TRAIN to C_MIN value |
| | Check L_DOUT = 0?<br>→ No : Do nothing<br>→ Yes : Proceed |
| | Check Q_DOUT = 0s > 1s ?<br>→ No : Increase VREFE<br>→ Yes : Decrease VREFE |
| | Store if VREFE is wobbling within threshold in register "VCTLE_LF<x>" |
| | Is RX_CTLE_RES_TRAIN reached threshold value[ R_MAX] value?<br>Yes : Reset RX_CTLE_RES_TRAIN to "R_MIN", X to <0> and Go to Step B<br>No : Increase RX_CTLE_RES_TRAIN by 1, increase register index <x> by 1 and go to step A |

| | |
|---|---|
| | STEP B: VCTLE_HF calculation under Finish<br>Use patterns3 for VCTLE_HF calculation<br><br>Load VREFE with "VCTLE_LF<x>" |
| | Check I_DOUT = 0 and I_DOUT_DLY =1?<br>→ No : Do nothing<br>→ Yes : Proceed |
| | Check Q_DOUT = 0s > 1s ?<br>→ No : Increase VREFE<br>→ Yes : Decrease VREFE<br><br>If ( VREFE – "VCTLE_LF<x>") > VCTLE_DV?<br>Yes: go to Step C<br>No : Continue |
| | Store if VREFE is wobbling within threshold in register "VCTLE_HF".<br><br>"VCTLE_DV" = ("VCTLE_HF" – "VCTLE_LF<x>") |
| | Store RX_CTLE_RES_TRAIN in "R_CODE" and RX_CTLE_CAP_TRAIN in "C_CODE". |
| | STEP C :<br>If RX_CTLE_RES_TRAIN and RX_CTLE_CAP_TRAIN reached Threshold value( R_MAX, C_MAX)<br>value?<br>Yes : Go to STEP D<br>No : Continue |
| | If RX_CTLE_CAP_TRAIN is max value ( C_MAX)?<br>Yes: increase RX_CTLE_RES_TRAIN by 1 increase register index <x> by 1, Set<br>RX_CTLE_CAP_TRAIN<2:0> = "C_MIN" and go to step B<br>No: increase RX_CTLE_CAP_TRAIN by 1 and go to step B |
| | STEP D: Load final values of R_CODE and C_CODE in RX_CTLE_RES and RX_CTLE_CAP and exit. |

1900
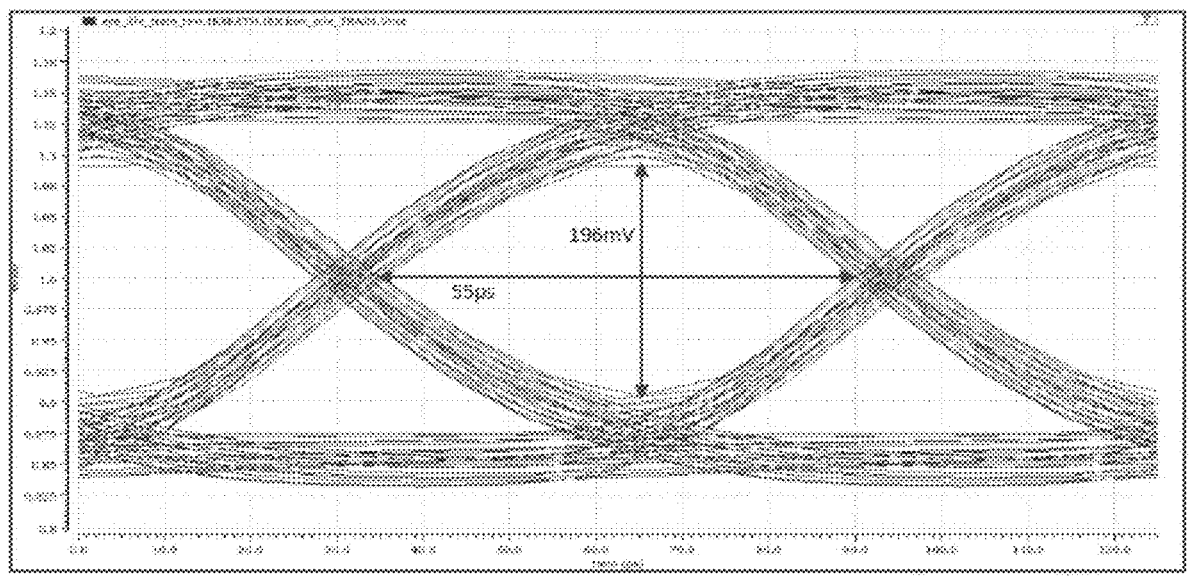
CTLE enabled (CTLE setting found by proposed Training algorithm). Eye is open with Eye height of 196mV and Eye width of 55ps
FIG. 19

CONTINUOUS TIME LINEAR EQUALIZATION SYSTEM AND METHOD

FIELD OF THE INVENTION

The present disclosure relates to serializer/deserializer systems (e.g., GDDR6 SerDes), and more specifically, to a method for continuous time linear equalization ("CTLE").

DISCUSSION OF THE RELATED ART

A typical computing device is implemented with a microprocessor, memory, and a number of other modules depending on the function to be performed by the computing device. DDR random access memory (RAM) is a particular type of RAM commonly used in current technology that performs two read accesses or two write accesses per clock cycle. Microprocessors and DDR RAM both operate on various different power supply voltages. Interface circuits that can convert between different signal levels and different drive levels are used to allow for compatible communications between microprocessors and memory devices.

Serializer/deserializer ("SerDes") components are becoming common on integrated System-on-a-chip ("SOC") and Application Specific Integrated Circuits ("ASICs"). The higher demand of high-speed wide-band data rates may require high-speed serial data links (or TX/RX links) that are widely used for sending data over various media, such as cables, board traces and/or backplanes. These media are often referred to as channels.

The continuous time linear equalization ("CTLE") for a SerDes receiver (e.g., GDDR6 SerDes) is a common equalization technique used in a high speed receiver for better timing and voltage margin. It is important to choose correct coefficients of equalizing filter to cancel inter symbol interference introduced by channel.

SUMMARY

In one or more embodiments of the present disclosure, a computer-implemented method for continuous time linear equalization training is provided. The method may include determining, using a decision feedback equalization ("DFE") training block, a voltage value for one or more resistor values. The method may further include determining, using the DFE training block, a voltage value for one or more capacitor values and identifying a voltage difference between the voltage value for one or more resistor values and the voltage value for one or more capacitor values. The method may further include iteratively performing the determining of the voltage value and identifying of the voltage difference for each of the plurality of capacitor values until the voltage difference is at one or more minimum values to generate one or more optimal resistor and capacitor coefficients for a continuous time linear equalization filter.

One or more of the following features may be included. The method may further include storing the optimal resistor and capacitor coefficient in a register and/or providing the optimal resistor and capacitor coefficient to the front end receiver. In some embodiments, the optimal resistor and capacitor coefficient may be generated without calculating an eye height and width for all resistor and capacitor values. The front end receiver may include a one tap unrolled receiver. The front end receiver may include a calibration receiver, higher voltage reference receiver, and a lower voltage reference receiver. The method may include performing an auto-zeroing operation using the calibration receiver.

In one or more embodiments of the present disclosure a computer-readable storage medium having stored thereon instructions, which when executed by a processor result in one or more operations is provided. Operations may include providing a front end receiver and a decision feedback equalization ("DFE") training block. Operations may further include determining using the DFE training block, a voltage value for one or more resistor values and determining, using the DFE training block, a voltage value for one or more capacitor values. Operations may also include identifying a voltage difference between the voltage value for one or more resistor values and the voltage value for one or more capacitor values. Operations may also include iteratively performing the determining of the voltage value and identifying of the voltage difference for each of the plurality of capacitor values until the voltage difference is at one or more minimum values to generate one or more optimal resistor and capacitor coefficients for a continuous time linear equalization filter. Operations may further include providing the optimal resistor and capacitor coefficient to a calibration receiver.

One or more of the following features may be included. Operations may include storing the optimal resistor and capacitor coefficient in a register and/or providing the optimal resistor and capacitor coefficient to the front end receiver. In some embodiments, the optimal resistor and capacitor coefficient may be generated without calculating an eye height and width for all resistor and capacitor values. The front end receiver may include a one tap unrolled receiver. The front end receiver may include a calibration receiver, higher voltage reference receiver, and a lower voltage reference receiver. Operations may include performing an auto-zeroing operation using the calibration receiver.

In one or more embodiments of the present disclosure, a system for continuous time linear equalization is provided. The system may include a plurality of receivers and a multiplexer configured to receive one or more inputs from the plurality of receivers. The system may also include DFE circuitry configured to receive one or more inputs from the multiplexer and one or more deserializers configured to receive one or more inputs from the multiplexer. The system may further include a multi-tap decision feedback equalization ("DFE") training block configured to receive one or more inputs from the one or more deserializers and to determine a voltage value for one or more resistor values. The DFE training block may be further configured to determine a voltage value for one or more capacitor values and to identify a voltage difference between the voltage value for the one or more capacitor values and the one or more resistor values. The DFE training block may be further configured to generate an optimal resistor and capacitor coefficient for a continuous time linear equalization filter based upon, at least in part, the voltage difference.

One or more of the following features may be included. The system may include a register for storing the optimal resistor and capacitor coefficient. The DFE training block may be configured to provide the optimal resistor and capacitor coefficient to the front end receiver. The optimal resistor and capacitor coefficient may be generated without calculating an eye height and width for all resistor and capacitor values. The front end receiver may include a one tap unrolled receiver. The front end receiver may include a calibration receiver, higher voltage reference receiver, and a lower voltage reference receiver.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIGS. 3-4 show a diagram and associated table consistent with an embodiment of the present disclosure;

FIG. 6 shows a table showing CTLE training control bits consistent with an embodiment of the present disclosure;

FIG. 7 shows a table showing CTLE training mode registers consistent with an embodiment of the present disclosure;

FIGS. 8-9 show CTLE training operations consistent with an embodiment of the present disclosure;

FIG. 19 shows a diagram showing a read eye opening with the CTLE trained filter coefficients consistent with an embodiment of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Figure 1:
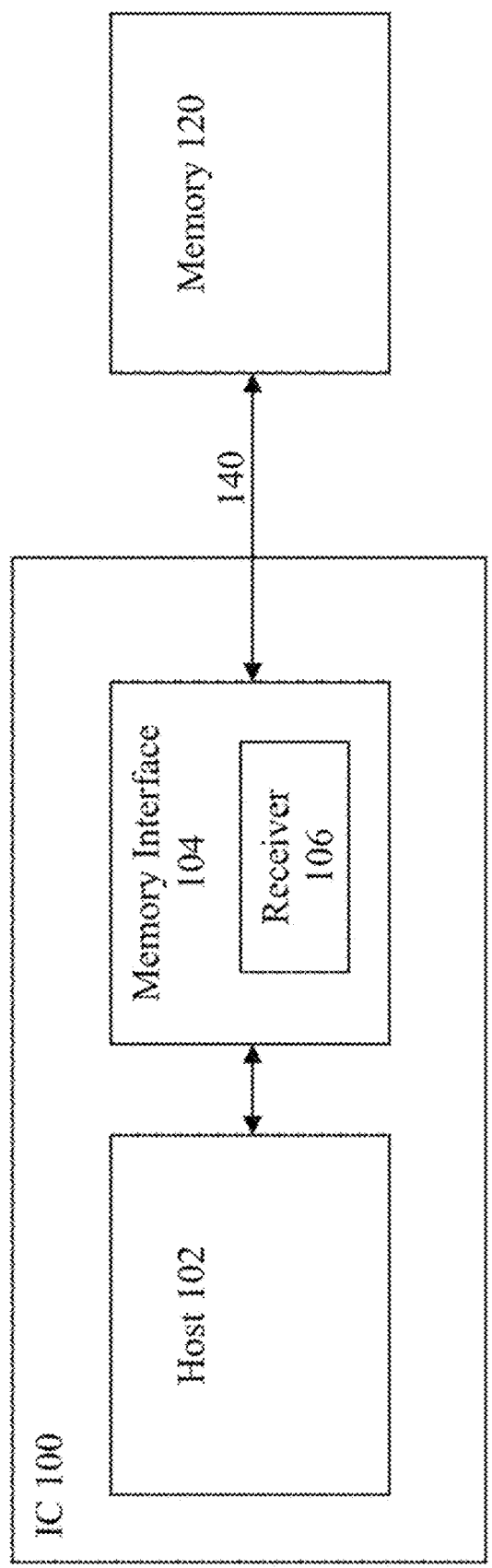
FIG. 1 is a block diagram of an example system in which the present embodiments may find useful application.

FIG. 1 illustrates an example interface between an integrated circuit (IC) 100 and a memory module 120, in accordance with some embodiments described herein. The memory module 120 may be a dynamic random access memory (DRAM) that may be connected to the integrated circuit by a bus 140, which may include an address bus, a data bus, read-write (R/W) signals, and a chip-enable (CE) signal. IC 100 may be an application specific integrated circuit (ASIC) or a system on a chip (SoC). Host 102 may be a microprocessor such as a CPU, DSP or processor core. Memory module 120 may be controlled on a system clock and can therefore be referred to as SDRAM. Embodiments of IC 100 may include additional components than shown in FIG. 1, however illustration thereof is omitted herein for sake of clarity.

Single data rate (SDR) SDRAM was originally built to execute one memory read access or one write access per clock cycle. On each clock cycle, an n-bit word may be transferred to or from the memory. The word length is, in some embodiments, configured in multiples of eight, and in more recent computer machines, it is common to transfer 64-bit words per clock cycle. DDR SDRAM was implemented as an improvement over SDR SDRAM and is capable of performing two read accesses or two write accesses per clock cycle. This was accomplished by performing one access on the rising edge of the clock and one access on the falling edge of the clock. In this manner, the data transfer rate may be doubled by transferring two 64-bit words per clock cycle. The standard protocols for operating DDR SDRAM are defined by JEDEC, with the most recent standards including DDR4, DDR5, GDDR6, etc.

In some embodiments, the operation of host 102 may involve the execution of programs that are loaded into the memory module 120 so as to create, edit, and delete data that may also be stored in the memory module 120 or other devices. Specifically, each microprocessor operation involves a fetch and execute cycle where an instruction is read from the memory module 120, decoded by the host 102, and executed. Also, the execution of the instruction often involves a data read or a data write to the memory module 120. Each of these instruction cycles may be performed synchronously to a system clock, with the duration of the instruction cycle lasting between one and three clock cycles.

More particularly, during a read operation, the host 102 may indicate the address location from which data from the memory module 120 is to be read. Memory interface 104 may be responsible for indicating the address on the address bus, floating the data bus (e.g., high Z or high impedance state), and asserting the CE and R/W signals for a read operation. Then the memory module 120 may place the data from the memory location indicated by the address bus onto the data bus. The memory interface 104 may then read the data from the data bus. More particularly, receiver 106 may convert the data signals from the memory module 120 to the voltage levels needed by host 102, and the read operation is complete. In this regard, memory types such as DDR4 typically operate between a VDDQ=1.32 Volt supply voltage down to a VDDQ=1.08 Volt supply voltage, while current microprocessor cores operate with a power supply voltage as low as VDD=0.65 Volts. The microprocessor supply voltage, core supply voltage, or signal supply voltage will be referred to herein as VDD while the memory supply voltage or I/O supply voltage will be referred to as VDDQ.

As will be discussed in greater detail below, embodiments of the present disclosure may address various challenges in conventional signal transmission and SerDes circuitry. Continuous time linear equalization is common equalization technique used in high speed receivers for better timing and voltage margin. These approaches involve selecting the correct coefficients for an equalizing filter to cancel inter symbol interference introduced by the channel. Embodiments of the present disclosure may be used in accordance with a GDDR6 SDRAM (Graphics Double Data Rate 6 Synchronous Dynamic Random-Access Memory), which is a type of synchronous graphics random-access memory (SGRAM) with a high bandwidth ("double data rate") interface designed for use in graphics cards, game consoles, and high-performance computing.

Figure 2:
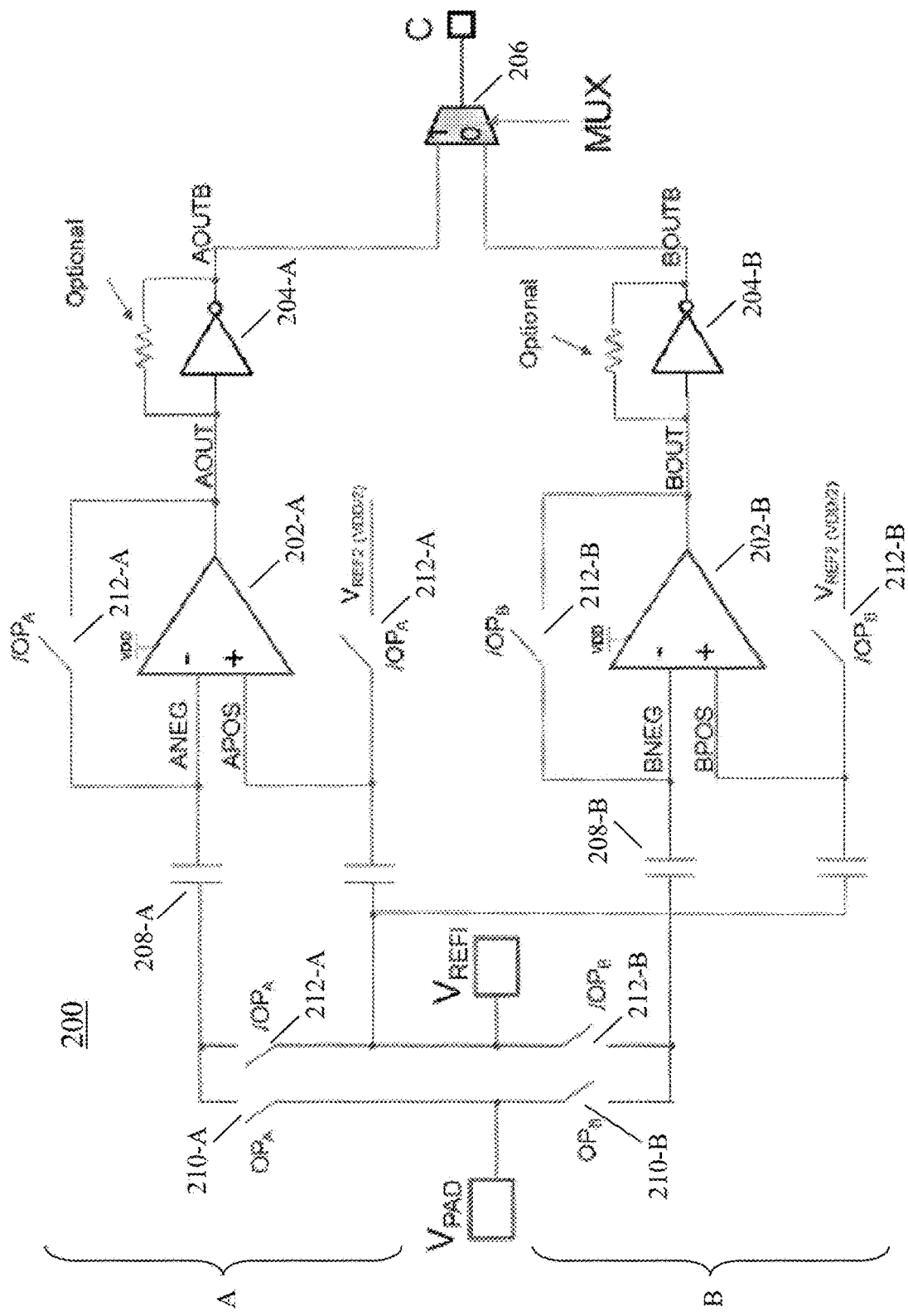
FIG. 2 is a diagram illustrating an example auto-zero receiver.

FIG. 2 is a block diagram illustrating an example architecture for receiver 200 according to embodiments. It should be noted that this architecture illustrated for receiving one bit of data from memory can be replicated based on the word size used in a particular application. Those skilled in the art of memory interfaces will understand how to adapt a receiver for a memory interface circuit (i.e. memory controller and/or PHY) with the dynamic auto-zeroing functionality of the present embodiments after being taught by the following examples. It should be noted that the receiver architecture of the present embodiments is not necessarily limited to a memory interface circuit on a separate chip or die from a memory chip or die. For example, the receiver architecture could be placed on a memory die and be connected to a memory controller PHY. Additional information regarding this architecture may be found in U.S. Pat. No. 10,545,895, available from the Assignee of the present application, which is herein incorporated by reference in its entirety.

In some embodiments, receiver 200 may include input pins VPAD and VREF1 and an output pin C. In general, receiver 200 provides an amplified output at pin C based on the data provided from DDR memory at input pin VPAD (i.e. one bit of data). VREF1 is a reference voltage that is used for detecting whether the VPAD signal is a logic "1" or a "0" and effectively represents the input common mode level of the circuit. In one example embodiment, the reference voltage is generated on the integrated circuit and is configurable.

According to certain AC coupling and "hot swap" operational aspects to be described in further detail below, receiver 200 according to embodiments includes duplicate receiver paths A and B. More particularly, as shown, example receiver 200 includes identical differential amplifiers 202-A and 202-B in paths A and B, respectively. Amplifier 202-A receives ANEG at an inverting input and APOS and a non-inverting input and outputs AOUT. Amplifier 202-B receives BNEG at an inverting input and BPOS at a non-inverting input and outputs BOUT.

As can be seen, the signal from the VPAD input pin (i.e. one bit of data from DDR memory) can be selectively provided via input capacitors 208-A and 208-B to either or both of the ANEG and BNEG inputs of amplifiers 202-A and 202-B, respectively, by operation of switches 210-A and 210-B controlled by signals OPA and OPB, respectively.

In some embodiments, switches 212-A and 212-B, controlled by signals /OPA and /OPB, respectively, are used to control an auto-zeroing operation for amplifiers 202-A and 202-B, respectively, as will be described more fully below. At the least, however, it should be noted that when switches 212-A and 212-B are closed, the APOS and BPOS input terminals for amplifiers 202-A and 202-B are respectively coupled in parallel to VREF1 and VREF2. It should be further apparent that signals /OPA and /OPB are complementary signals of OPA and OPB, respectively.

Inverter 204-A inverts AOUT from amplifier 202-A to AOUTB. Inverter 204-B inverts BOUT from amplifier 202-B to BOUTB. Mux 206 selects one of AOUTB or BOUTB for output to pin C based on input selection signal MUX. In one possible example, when the MUX signal is "high" or logic "1," Mux 206 selects AOUTB for output to output pin C, and when the MUX signal is "low" or logic "0," Mux 206 selects BOUTB for output to output pin C.

Reference voltage VREF2 is coupled to a voltage divider that divides VDD in half in an example open-loop configuration of receiver 200.

In some embodiments, the auto zero receiver may null out any input referred mismatch in the differential amplifiers. Due to strict area, bandwidth and power requirements of DDR receivers, a non-trivial amount of input referred mismatch may be present. This mismatch must be zeroed out through some form of calibration to achieve acceptable Setup/Hold margin during Read operations.

In some embodiments, the auto zero receiver may zero-out the charge across the input capacitor which is connected between the external input signal (to be amplified) and the input to the differential amplifier. This may be required as the charge across this input capacitor will incur some leakage overtime as nodes "ANEG" and "APOS" from FIG. 2 may have a non-infinite impedance to surrounding voltage sources.

In some embodiments, the auto zero receiver may keep a constant input common as seen by each differential amplifier. That is to say the external input signal may be AC coupled into "ANEG" and "APOS" nodes to keep the input common mode voltage of signal "ANEG" and "APOS" constant across any range of external input common mode levels.

To further simplify, some embodiments may include multiple (in this example, four) modes of operation which may sequentially occur in this specific configuration. Both receiver "A" and "B" may be auto zeroed before the operations below. Receiver "A" is in read operation while receiver "B" is auto-zeroing, receiver "A" is in read operation and receiver "B" is in read operation together, receiver "A" is auto-zeroing while receiver "B" is in read operation, and receiver "A" is in read operation and receiver "B" is in read operation together. The sequence may then be repeated in whole or in part. As can be seen from the above sequence, there is continuous read functionality with no disturbances from auto-zeroing process. This process can be further extended to accommodate more receiver paths used in parallel for DFE functionality.

Figure 3:
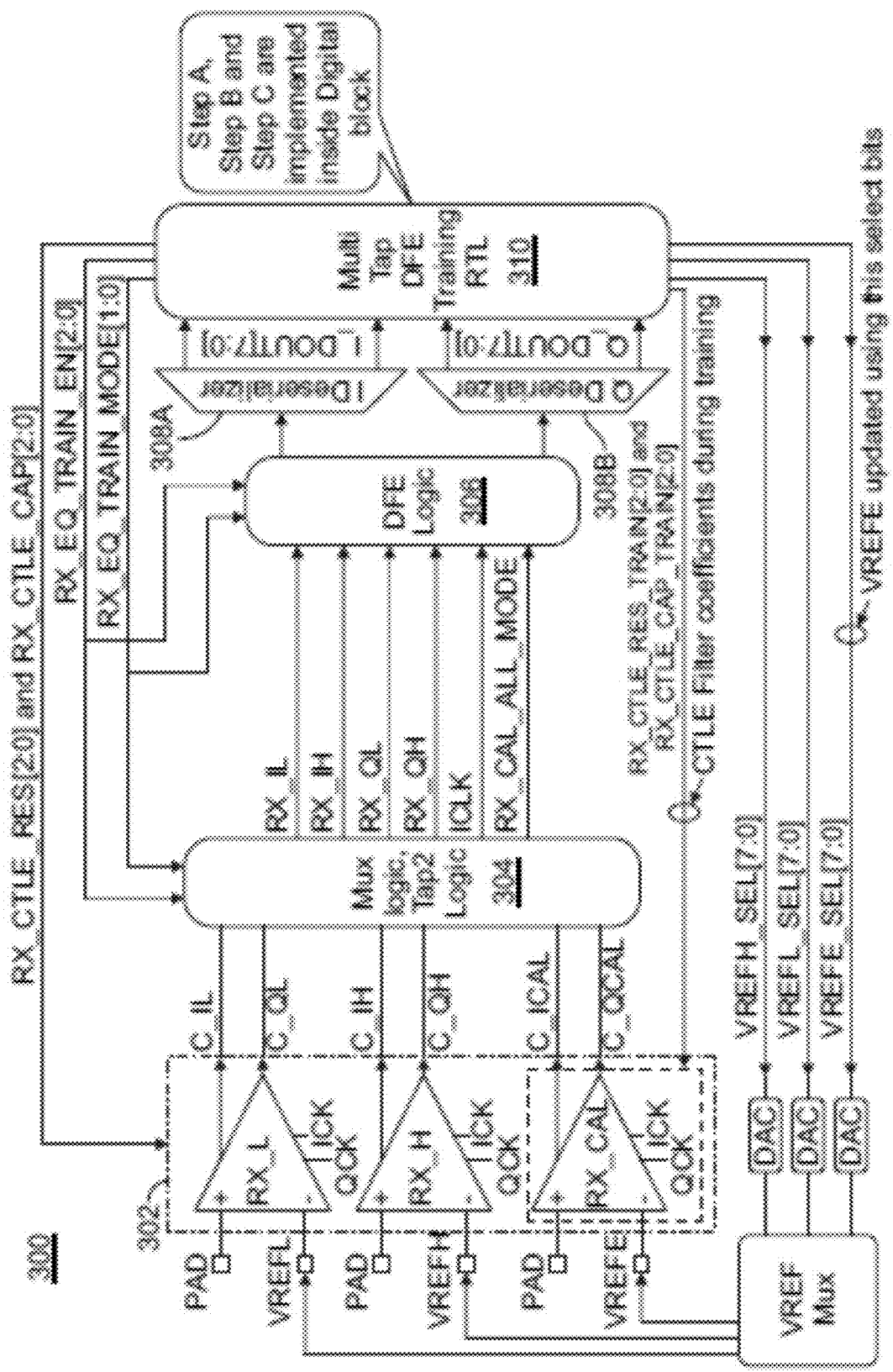

Referring now to FIG. 3, a diagram depicting circuitry 300 for continuous time linear equalization in accordance with embodiments of the present disclosure. FIG. 4 provides a table that shows the terms from FIG. 3 with associated descriptions. Circuitry 300 may include a plurality of receivers 302 and one or more multiplexers 304 configured to receive one or more inputs from the plurality of receivers 302. Receivers 302 may include, but are not limited to, a calibration receiver, a higher voltage reference receiver, and a lower voltage reference receiver.

In some embodiments, multiplexers 304 may be in communication with DFE logic 306, which provides one or more outputs to deserializers 308A and 308B. DFE circuitry 306 may configured to receive one or more inputs from one or more multiplexers 304. Circuitry 300 may further include multi-tap decision feedback equalization ("DFE") training block 310 configured to receive one or more inputs from the one or more deserializers and to determine a voltage value of DC or a very low frequency signal logic "0" value for one or more resistor values. DFE training block 310 may be further configured to determine a voltage value of high frequency signal logic "0" value for one of a plurality of capacitor values and to identify a voltage difference between the high frequency logic "0" value and DC or the very low frequency logic "0" value of a corresponding resistor value. DFE training block 310 may be further configured to iteratively perform the determining of the voltage value and identifying of the voltage difference for each of the plurality of capacitor values until the voltage difference is at one or more minimum values to generate an optimal resistor and capacitor coefficient for a continuous time linear equalization filter.

In some embodiments, circuitry 300 may include one or more registers for storing the one or more optimal resistor and capacitor coefficients. DFE training block 310 may be configured to provide the one or more optimal resistor and capacitor coefficients to receivers 302, which may include a one tap unrolled receiver. The optimal resistor and capacitor coefficients may be generated without calculating an eye height and width for all resistor and capacitor values.

In operation, the CTLE training may include a number of operations as is discussed in further detail hereinbelow. In a first operation (e.g., step A), the process may determine the voltage value of DC or very low frequency signal logic "0" value for each resistor values. In a second operation (e.g., step B), the process may determine the voltage value of high frequency signal logic "0" value for each capacitor value in the CTLE filter and identify the voltage difference "ΔV" between high frequency logic "0" and DC or very low frequency logic "0" of a corresponding resistor value. In a third operation, (e.g., step C), the process may continue for all capacitor values and resistor values until the voltage difference "ΔV" hits minima. The final RX_CTLE_RES_TRAIN (resistor value) and RX_CTLE_CAP_TRAIN (capacitor value) coefficients of the CTLE filter which gives minimum "ΔV" may be stored in one or more register. In some embodiments, the unrolled DFE receiver, Q deserializers 308A and 308B and DFE training error RTL 310 may be reused to minimize the overall hardware required.

Accordingly, embodiments of the CTLE training approach included herein may determine the optimal values of resistors and capacitors. These may correspond to the equalization filter coefficients of front end receiver. These trained values, when applied to the CTLE based front-end receiver help to improve eye margin. It should be noted that this training does not require any additional hardware to find out optimal CTLE coefficients.

Figure 5:
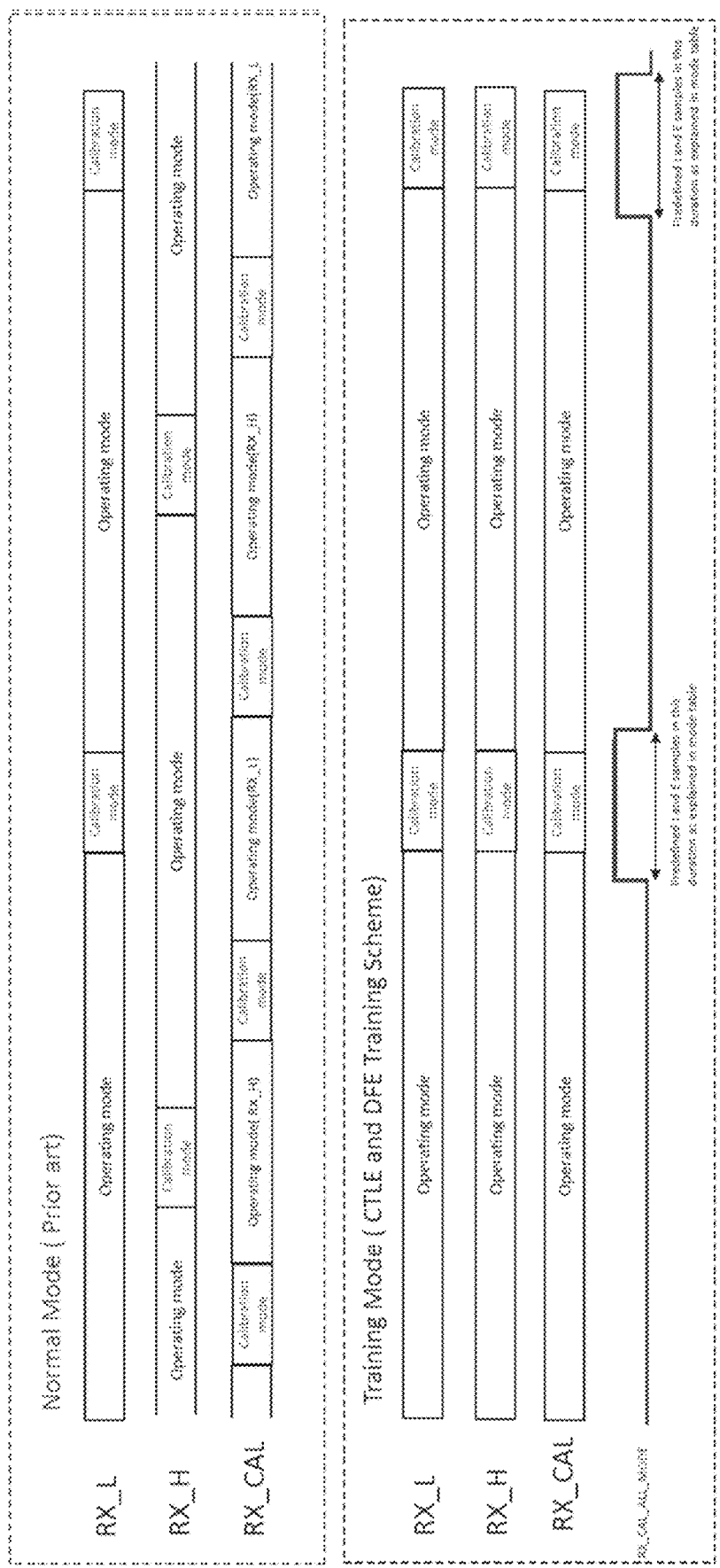
FIG. 5 shows a diagram normal and training modes for an auto-zeroing receiver consistent with an embodiment of the present disclosure.

Referring now to FIG. 5, a diagram contrasting a prior art methodology with embodiments of the present disclosure is provided. FIGS. 6-7 show a diagrams depicting CTLE training modes consistent with embodiments of the present disclosure. FIG. 6 shows control bits and FIG. 7 shows examples including register details such as the register name and data stored. During the states highlighted in FIG. 6, all receivers may autozero to calibrate out an input referred offset (see FIG. 5). As such, during this time received samples are not valid. Thus, to avoid errors, I samples and E samples are defined such a way that CTLE training algorithm ignores these samples during calibration mode.

Referring now to FIGS. 8-9, diagrams showing an example with CTLE training operations is provided. These operations may be repeated multiple times if it is a high lossy channel (e.g., closed eye). For each iteration, VREFL and VREFH may be initialized with the previous iteration final values.

Figure 10:
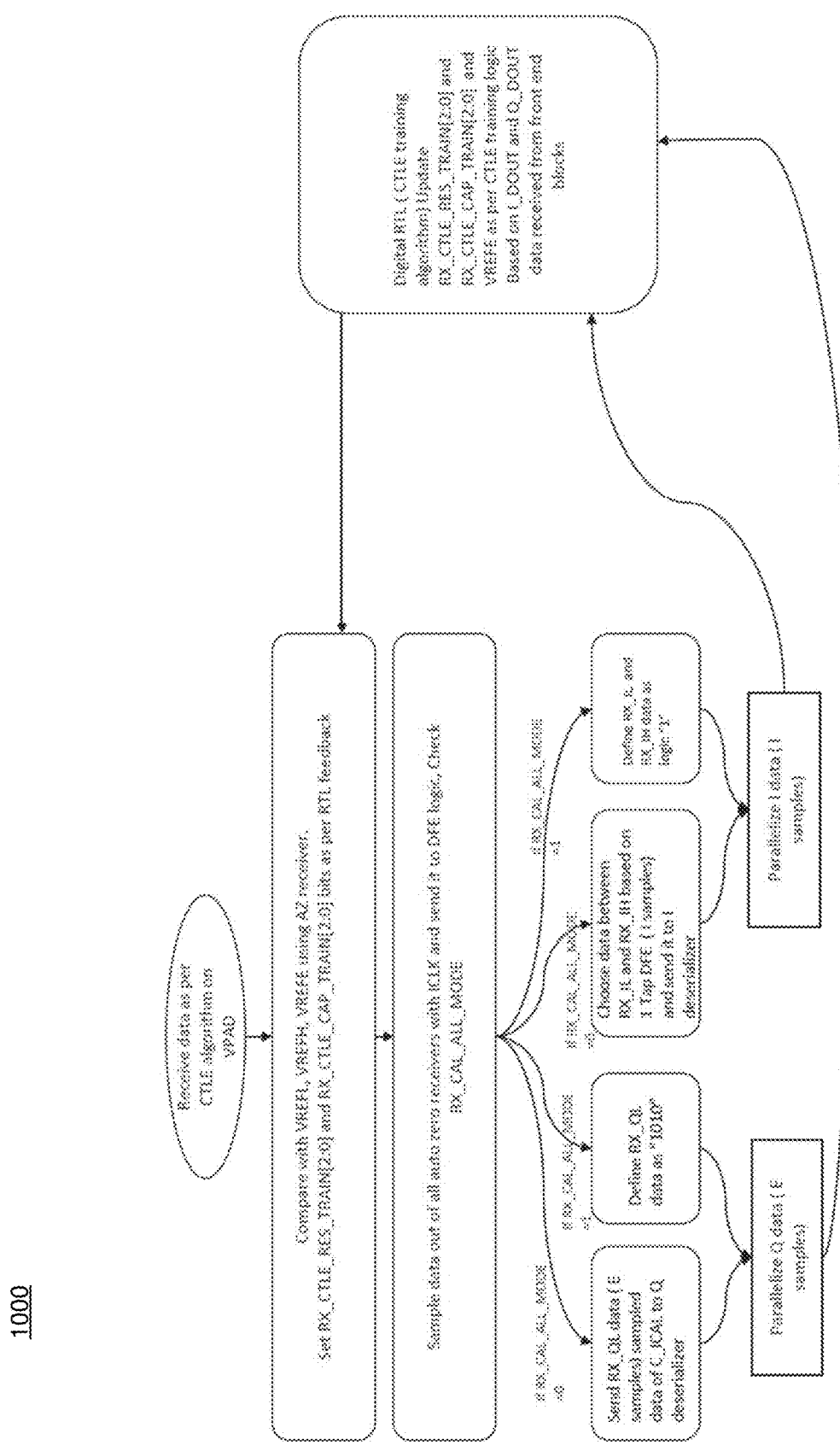
FIG. 10 is a flowchart depicting operations consistent with an embodiment of the present disclosure.

Referring now to FIG. 10, a flowchart 1000 depicting operations consistent with embodiments of the present disclosure is provided.

Figure 11:
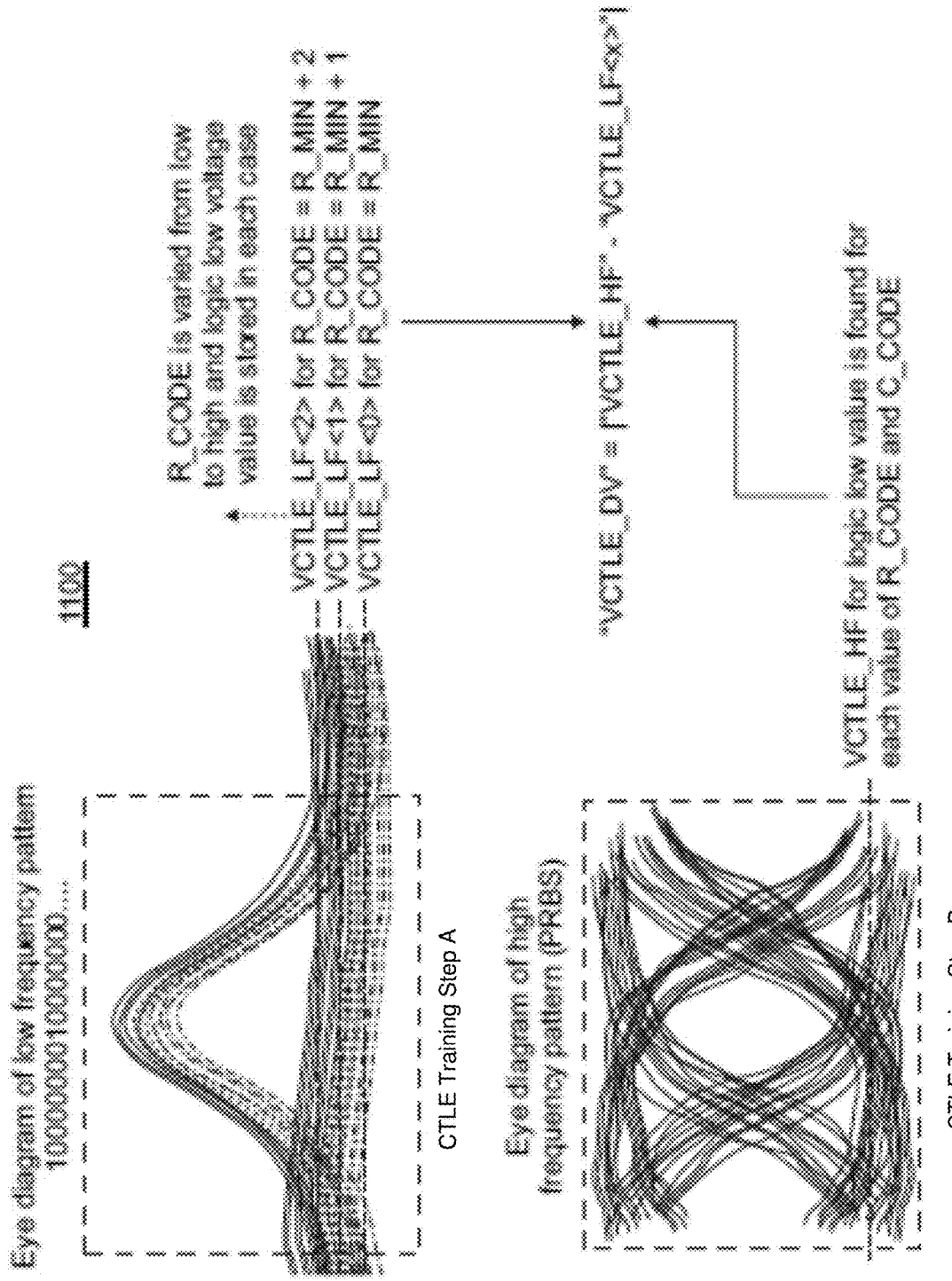
FIG. 11 shows a diagram depicting CTLE training steps consistent with an embodiment of the present disclosure.

Referring now to FIG. 11, a diagram depicting graphical illustrations of CTLE training operations are provided. The first portion of FIG. 11 shows CTLE training step A and an eye diagram of low frequency pattern (e.g., 1000000010000000 . . . ). The second portion of FIG. 11 shows CTLE training step B and an eye diagram of high frequency pattern (e.g. PRBS).

Figure 12:
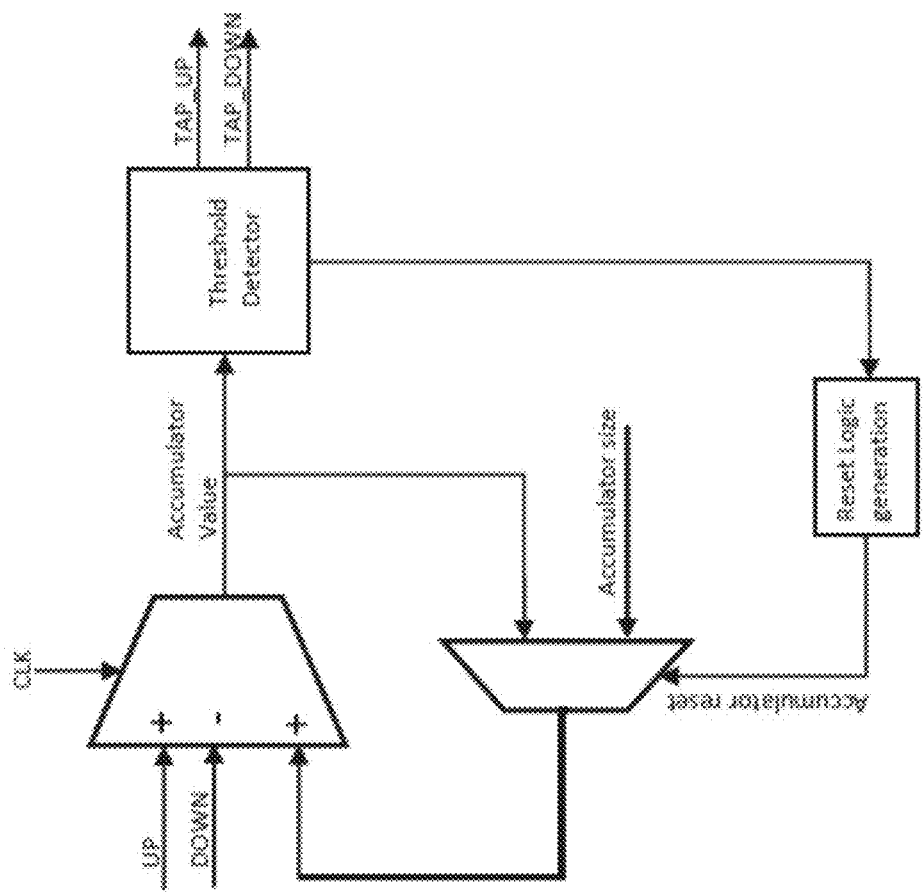
FIGS. 12-13 is a diagram and plot depicting CTLE training up/down decision making consistent with an embodiment of the present disclosure.
Figure 13:
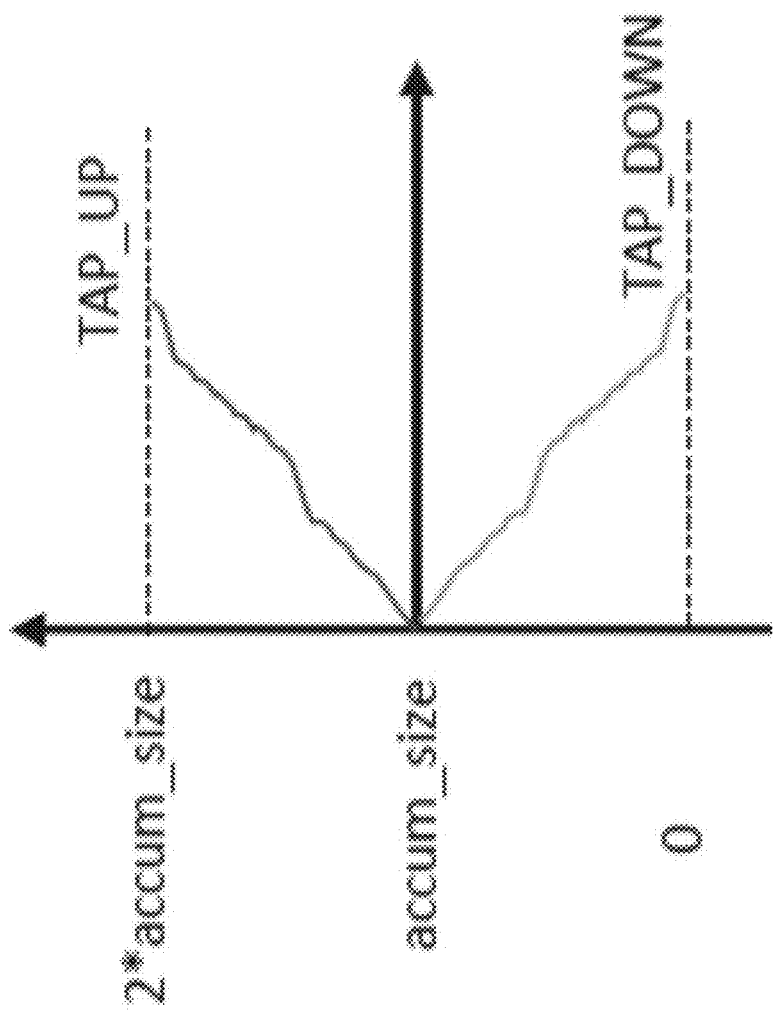

Referring now to FIGS. 12-13, a diagram 1200 and associated plot 1300 showing tap up and tap down coefficient update logic is provided. In operation, a low frequency and PRBS bit pattern may be used for CTLE training. This pattern may be received from the front end receiver. 8 bit parallel I_DOUT and Q_DOUT may be generated (e.g. I samples and E samples). UP and DOWN signals Resistor and Capacitor code may be generated from the bitwise operation of I_DOUT and Q_DOUT data. I_DOUT and Q_DOUT data conditions for CTLE filter coefficient update are explained in CTLE training steps.

As shown in FIG. 13, the accumulator may be used to determine an effective increment or decrement of filter coefficients. Initial value of accumulator is set to the accumulator size "accum_size". Number of 'UP' and 'DOWN' are found out from parallel data I_DOUT and Q_DOUT. For each parallel set of data UP-DOWN may be calculated and added to accumulator as shown in FIG. 13.

In some embodiments, the upper and lower threshold may be set to accumulator (e.g., plot of FIG. 13). If the accumulator reaches the upper threshold (2* accum_size) TAP_UP signal may be generated and if it reaches the lower threshold (0) TAP_DOWN signal may be generated. Once a threshold is reached accumulator is reset to initial value i.e. "accum_size" as shown in the plot of FIG. 13. It should be noted that the description mentioned with reference to FIG. 13 is only for reference purpose as the logic implemented for DFE training may be re-used to reduce hardware.

Figure 14:
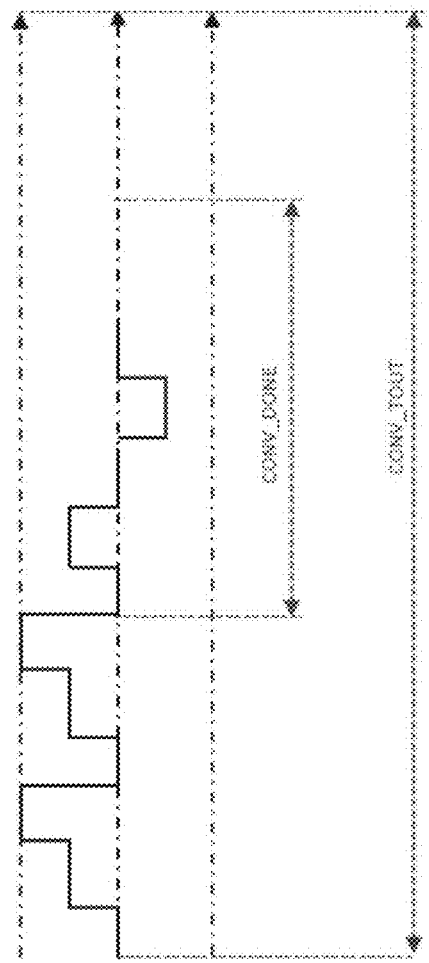
FIG. 14 is a diagram showing an example of CTLE convergence in accordance with the present disclosure.

Referring now to FIG. 14, a diagram showing filter coefficient convergence is provided. In some embodiments, the convergence threshold may determine the accuracy of final CTLE filter coefficients. A convergence counter may be used to arrive at final coefficients. Counter count value may be set initially to "2*conv_threshold", which counts up to a maximum "3*conv_threshold" and minimum "conv_threshold". The counter may be re-initialized to "2*conv_threshold" every time its count value reaches maximum and minimum value set or when it moves to next training step.

In some embodiments, the counter may count up if TAP_UP signal is generated and counts down if TAP_DOWN signal is generated. Another counter may count the number of clock cycles from beginning of training. A final filter value may be determined when this count reaches the following 2 programmed values (each value is defined for a particular scenario).

CONV_DONE: If the counter is not reset for this many clock cycles then convergence may be achieved and final filter values are restored.

CONV_TOUT: If the counter does stop getting reset for this many clock cycles then convergence is not achieved, this raises a "time out" signal and the last filter values are stored. The discussion of FIGS. 12-14 is provided merely for reference purposes as logic implemented for DFE training may be re-used to reduce hardware.

Embodiments of the present disclosure provide numerous advantages over existing approaches. The CTLE training approach described herein may determine resistor and capacitor values of the equalization filter in far less time as existing approaches. Eye height and width does not need to be calculated for all combinations of resistor and capacitor values as in conventional approaches. These approaches require additional hardware to measure and store information of eye height and width for each combination of resistor and capacitor.

Figure 15:
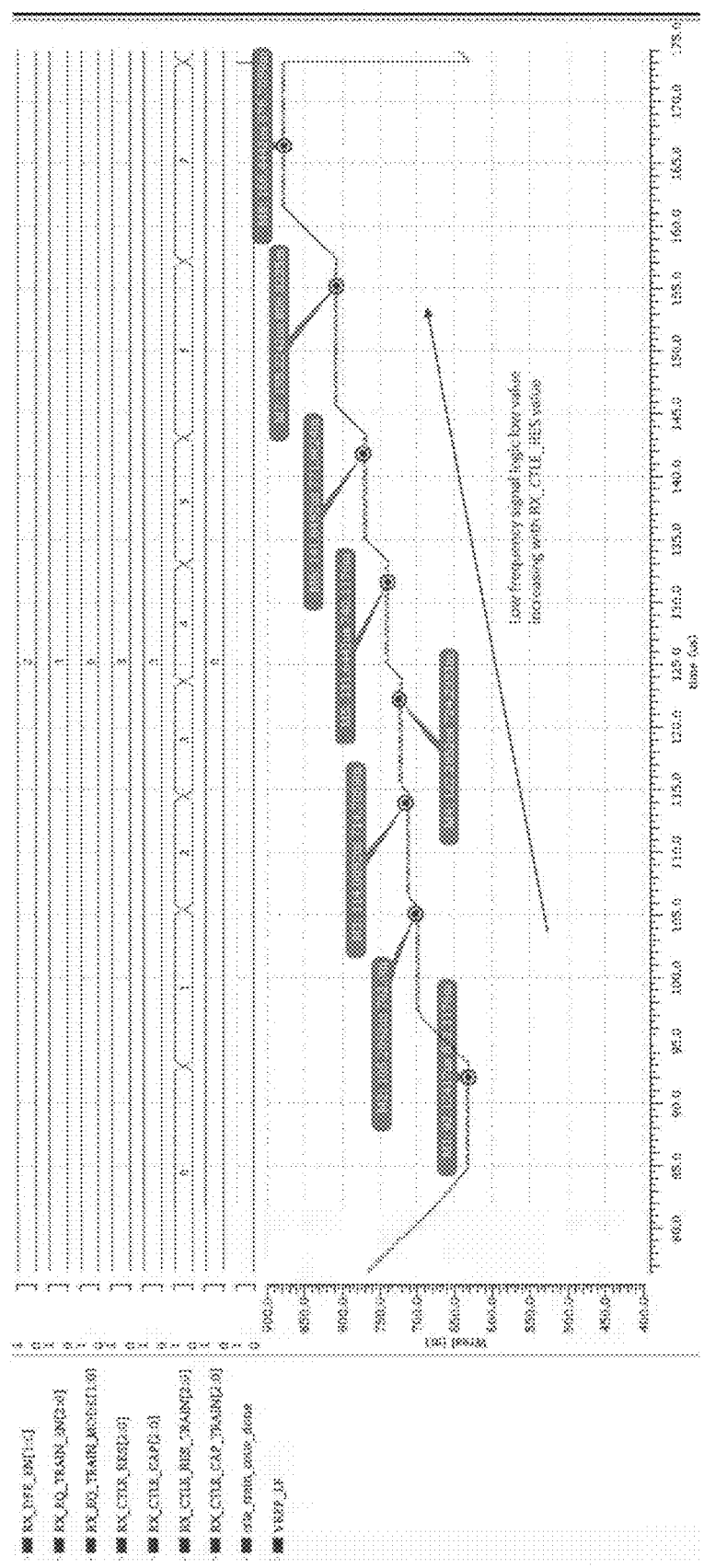
FIG. 15 is a diagram showing training step A simulation results consistent with an embodiment of the present disclosure.
Figure 16:
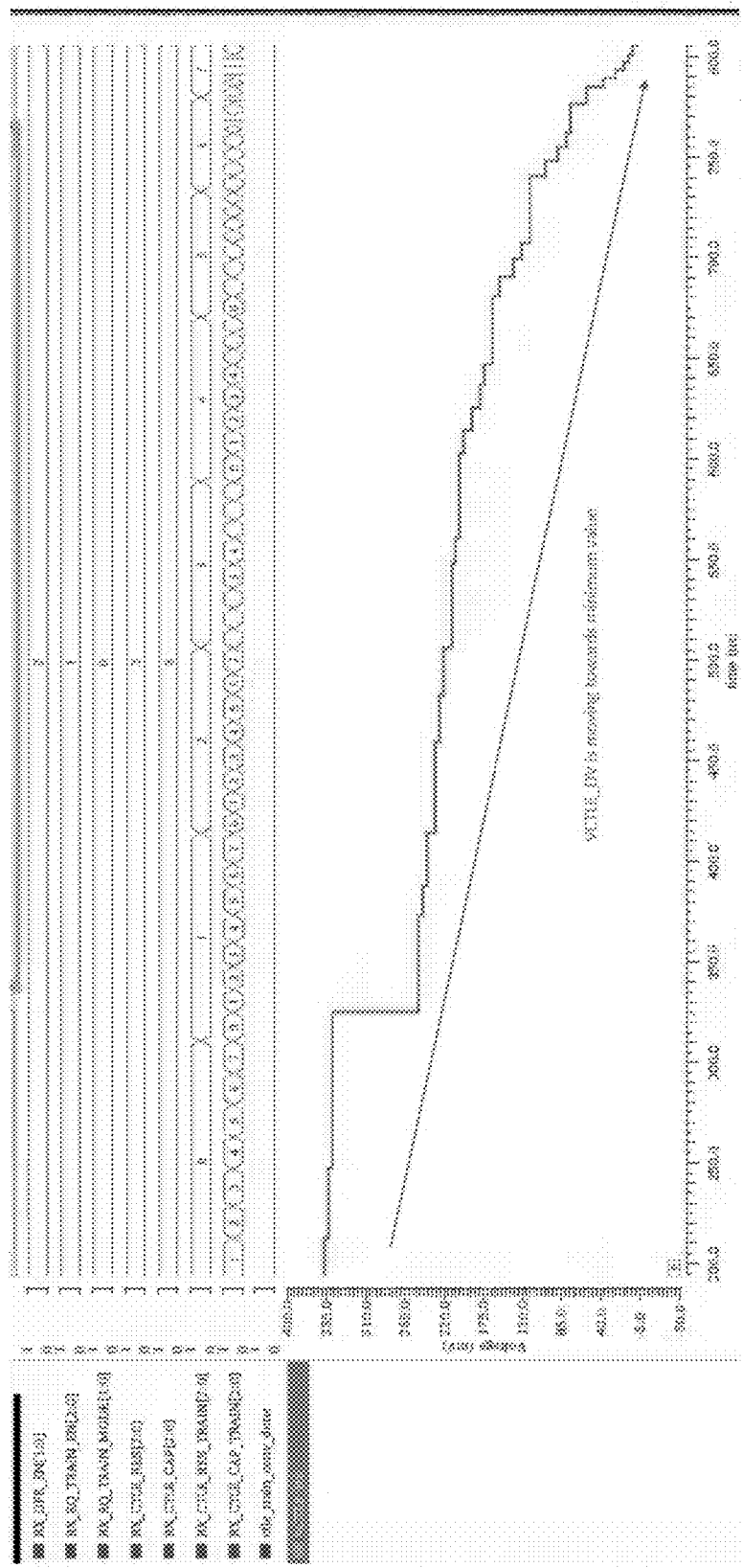
FIG. 16 is a diagram showing training step B simulation results consistent with an embodiment of the present disclosure.
Figure 17:
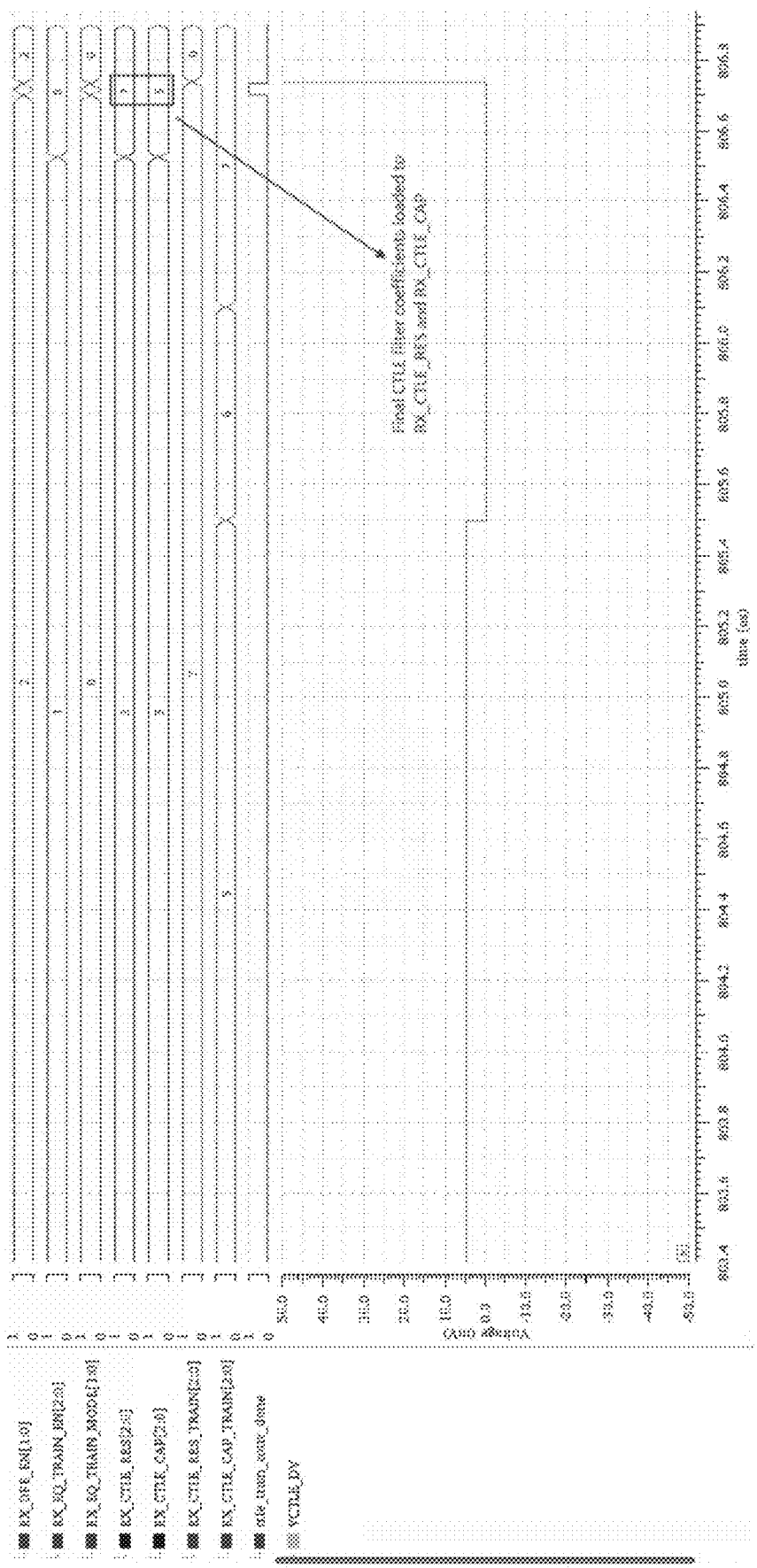
FIG. 17 is a diagram showing final training simulation results consistent with an embodiment of the present disclosure.
Figure 18:
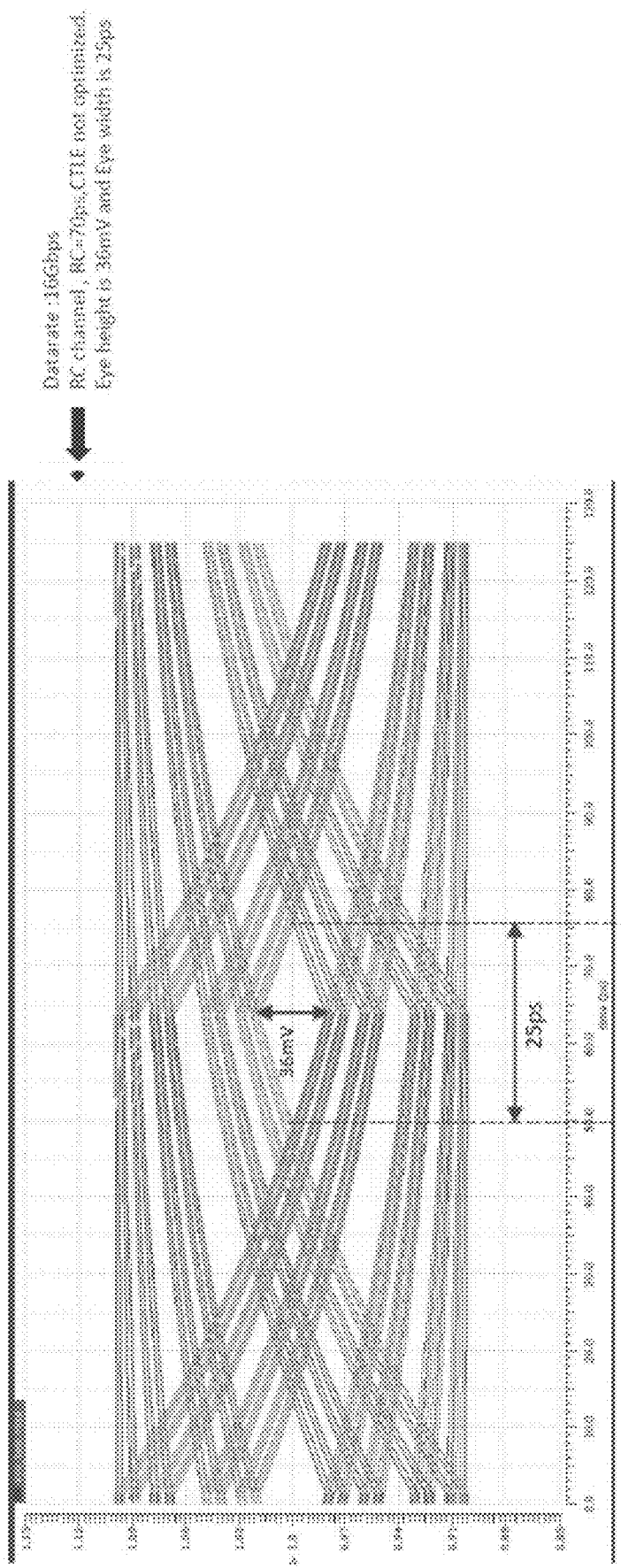
FIG. 18 shows a diagram showing a read eye opening without any CTLE trained filter coefficients.

Referring now to FIGS. 15-19, diagrams depicting simulation results for the CTLE training described herein are provided. FIG. 15 shows step A simulation results, FIG. 16 shows step B simulation results, and FIG. 17 shows final CTLE training results. FIGS. 18-19 show a read eye opening with CTLE trained filter coefficients.

Figure 20:
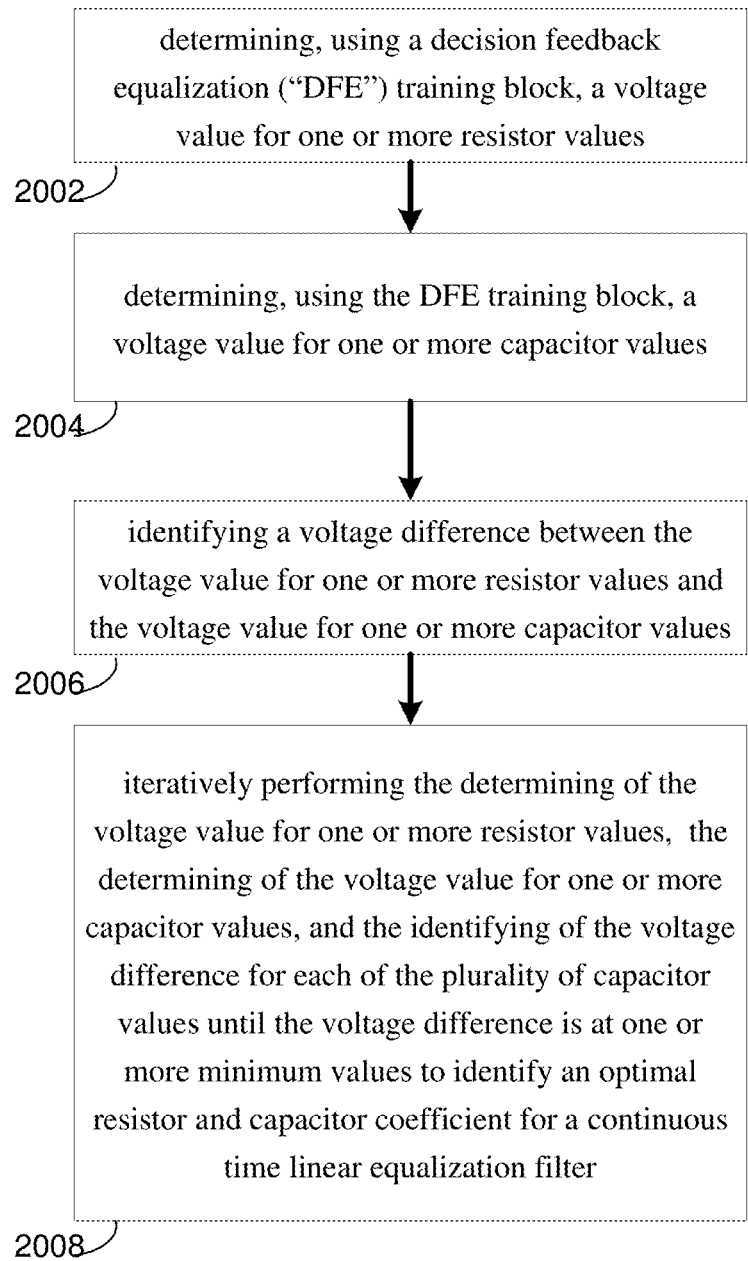
FIG. 20 includes a flowchart depicting operations consistent with an embodiment of the present disclosure.

Referring now to FIG. 20, a flowchart showing operations consistent with embodiments of the CTLE training described herein. Operations may include determining 2002, using a decision feedback equalization ("DFE") training block, a voltage value for one or more resistor values. The method may further include determining 2004, using the DFE training block, a voltage value for one or more capacitor values and identifying 2006 a voltage difference between the voltage value for one or more resistor values and the voltage value for one or more capacitor values. The method may further include iteratively performing 2008 the determining of the voltage value and identifying of the voltage difference for each of the plurality of capacitor values until the voltage difference is at one or more minimum values to generate one or more optimal resistor and capacitor coefficients for a continuous time linear equalization filter. Numerous other operations are also within the scope of the present disclosure as discussed above.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A continuous time linear equalization training method, comprising:
    determining, using a decision feedback equalization ("DFE") training block, a voltage value for one or more resistor values;
    determining, using the DFE training block, a voltage value for one or more capacitor values;
    identifying a voltage difference between the voltage value for one or more resistor values and the voltage value for one or more capacitor values; and
    iteratively performing the determining of the voltage value and identifying of the voltage difference for each of the plurality of capacitor values until the voltage difference is at one or more minimum values to generate one or more optimal resistor and capacitor coefficients for a continuous time linear equalization filter.

2. The continuous time linear equalization training method of claim 1, further comprising:
    storing the optimal resistor and capacitor coefficient in a register.

3. The continuous time linear equalization training method of claim 1, further comprising:
    providing the optimal resistor and capacitor coefficient to a front end receiver.

4. The continuous time linear equalization training method of claim 1, wherein the optimal resistor and capacitor coefficient are generated without calculating an eye height and width for all resistor and capacitor values.

5. The continuous time linear equalization training method of claim 3, wherein the front end receiver includes a one tap unrolled DFE receiver.

6. The continuous time linear equalization training method of claim 1, wherein the front end receiver includes an auto-zero calibration receiver, higher voltage reference receiver, and a lower voltage reference receiver.

7. The continuous time linear equalization training method of claim 6, further comprising:
    performing an auto-zeroing operation using the calibration receiver.

8. A non-transitory computer readable storage medium having stored thereon instructions, which when executed result in one or more operations, the operations comprising:
    providing a front end receiver and a decision feedback equalization ("DFE") training block;
    determining using the DFE training block, a voltage value for one or more resistor values;
    determining, using the DFE training block, a voltage value for one or more capacitor values;
    identifying a voltage difference between the voltage value for one or more resistor values and the voltage value for one or more capacitor values;
    iteratively performing the determining of the voltage value and identifying of the voltage difference for each of the plurality of capacitor values until the voltage difference is at one or more minimum values to generate one or more optimal resistor and capacitor coefficients for a continuous time linear equalization filter; and
    providing the optimal resistor and capacitor coefficient to a calibration receiver.

9. The non-transitory computer readable medium of claim 8, the operations further comprising:
    storing the optimal resistor and capacitor coefficient in a register.

10. The non-transitory computer readable medium of claim 8, the operations further comprising:
    providing the optimal resistor and capacitor coefficient to the front end receiver.

11. The non-transitory computer readable medium of claim 8, wherein the optimal resistor and capacitor coefficient are generated without calculating an eye height and width for all resistor and capacitor values.

12. The non-transitory computer readable medium of claim 8, wherein the front end receiver includes a one tap unrolled receiver.

13. The non-transitory computer readable medium of claim 8, wherein the front end receiver includes a calibration receiver, higher voltage reference receiver, and a lower voltage reference receiver.

14. The non-transitory computer readable medium of claim 13, the operations further comprising:
performing an auto-zeroing operation using the calibration receiver.

15. A system for continuous time linear equalization, comprising:
a plurality of receivers;
a multiplexer configured to receive one or more inputs from the plurality of receivers;
DFE circuitry configured to receive one or more inputs from the multiplexer;
one or more deserializers configured to receive one or more inputs from the multiplexer; and
a multi-tap decision feedback equalization ("DFE") training block configured to receive one or more inputs from the one or more deserializers and to determine a voltage value for one or more resistor values, the DFE training block further configured to determine a voltage value for one or more capacitor values and to identify a voltage difference, the DFE training block further configured to generate an optimal resistor and capacitor coefficient for a continuous time linear equalization filter based upon, at least in part, the voltage difference.

16. The continuous time linear equalization training system of claim 15, further comprising:
a register for storing the optimal resistor and capacitor coefficient.

17. The continuous time linear equalization training system of claim 15, wherein the DFE training block is configured to provide the optimal resistor and capacitor coefficient to the front end receiver.

18. The continuous time linear equalization training system of claim 15, wherein the optimal resistor and capacitor coefficient are generated without calculating an eye height and width for all resistor and capacitor values.

19. The continuous time linear equalization training system of claim 15, wherein the front end receiver includes a one tap unrolled receiver.

20. The continuous time linear equalization training system of claim 15, wherein the front end receiver includes a calibration receiver, higher voltage reference receiver, and a lower voltage reference receiver.

* * * * *